United States Patent
Ohira et al.

(10) Patent No.: US 9,767,961 B2
(45) Date of Patent: Sep. 19, 2017

(54) COMPOSITE ELECTRONIC COMPONENT

(75) Inventors: Naoto Ohira, Nagoya (JP); Natsumi Shimogawa, Nagoya (JP); Hirofumi Yamaguchi, Komaki (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 713 days.

(21) Appl. No.: 13/418,764

(22) Filed: Mar. 13, 2012

(65) Prior Publication Data

US 2012/0236459 A1      Sep. 20, 2012

(30) Foreign Application Priority Data

Mar. 18, 2011  (JP) ................... 2011-060140
Feb. 7, 2012   (JP) ................... 2012-023659

(51) Int. Cl.
*H01F 17/00* (2006.01)
*H01G 4/30* (2006.01)
*H01G 4/40* (2006.01)

(52) U.S. Cl.
CPC ............. *H01G 4/30* (2013.01); *H01F 17/0013* (2013.01); *H01G 4/40* (2013.01); *H01F 2017/0026* (2013.01)

(58) Field of Classification Search
CPC ............... G11B 5/3903; G11B 5/3909; Y10T 29/49044; Y10T 428/32; Y10T 29/4902; Y10T 29/49075; Y10T 29/49155; Y10T 428/24917; Y10T 428/24942; Y10T 428/26; Y10T 428/2848; H01G 4/228; H01G 4/40; H01G 2/06; H01G 4/224; H01G 13/006; H01G 2/065; H01G 2/08; H01G 2/10; H01G 4/10; H01G 4/12; H01G 4/33; H01G 7/06; H01G 9/14; H01G 4/30; H01F 2027/2809; H01F 27/2804; H01F 17/0013; H01F 17/0033; H01F 17/06; H01F 1/14708; H01F 2017/002; H01F 27/24; H01F 2017/0066; H01F 41/02;
(Continued)

(56) References Cited

U.S. PATENT DOCUMENTS

2002/0048872 A1   4/2002   Yamaguchi
2002/0064669 A1   5/2002   Oobuchi et al.
2002/0118519 A1*  8/2002   Umemoto et al. ............ 361/748
(Continued)

FOREIGN PATENT DOCUMENTS

EP    1 219 577 A2    7/2002
JP    58-172804 A1    10/1983
(Continued)

OTHER PUBLICATIONS

Official Translation of JP 2002100947 A.*
(Continued)

*Primary Examiner* — Holly Rickman
*Assistant Examiner* — Lisa Chau
(74) *Attorney, Agent, or Firm* — Burr & Brown, PLLC

(57) ABSTRACT

The present invention relates to a composite electronic component having a dielectric body portion inside of which a conductive body is provided, and a magnetic body portion inside of which a conductive body is provided. In the present invention, a layer made of a metal material is arranged between the dielectric body portion and the magnetic body portion as an intermediate layer.

8 Claims, 10 Drawing Sheets

(58) Field of Classification Search
CPC .......... H01F 41/046; H01F 41/14; H01F 5/00;
H01F 2017/0026
USPC ................ 336/200, 232, 84 C; 361/782–784
See application file for complete search history.

(56) References Cited

U.S. PATENT DOCUMENTS

| | | |
|---|---|---|
| 2006/0014303 A1 | 1/2006 | Takazawa |
| 2009/0009267 A1* | 1/2009 | Miyata et al. ................ 333/185 |

FOREIGN PATENT DOCUMENTS

| | | | |
|---|---|---|---|
| JP | 59-033247 B2 | | 8/1984 |
| JP | 06-029128 U1 | | 4/1994 |
| JP | 06-176967 A1 | | 6/1994 |
| JP | 11-243034 A1 | | 9/1999 |
| JP | 2002-057036 A1 | | 2/2002 |
| JP | 2002057036 A | * | 2/2002 |
| JP | 2002-100947 A1 | | 4/2002 |
| JP | 2002100947 A | * | 4/2002 |
| JP | 2007-214166 A1 | | 8/2007 |
| JP | 4020886 B2 | | 12/2007 |

OTHER PUBLICATIONS

Extended European Search Report dated Jul. 16, 2012.
Japanese Office Action (Application No. 2012-023659) dated Dec. 22, 2015 (with partial English translation).

\* cited by examiner

COMPOSITE ELECTRONIC COMPONENT

TECHNICAL FIELD

The present invention relates to a composite electronic component.

BACKGROUND ART

Patent Document 1 describes a LC composite component serving as a composite electronic component. The LC composite component is formed by jointing a part made of a dielectric material (hereinafter, this part is called the "dielectric body portion") and a part made of a magnetic material (hereinafter, this part is called the "magnetic body portion") via a part made of a specific material (hereinafter, this part is called the "intermediate part"). In the LC composite component, plural pairs of electrodes including conductive bodies are provided inside of the dielectric body portion, the dielectric body portion functions as a capacitor, a coil including a conductive body is formed inside of the magnetic body portion, and the magnetic body portion functions as an inductor.

The dielectric body portion of the composite electronic component described in Patent Document 1 is formed of a material of crystallized glass containing $SiO_2$, $Al_2O_3$, CaO, and the like, the material containing Ni—Cu—Zn ferrite. Meanwhile, the magnetic body portion of the composite electronic component described in Patent Document 1 is formed of magnetic ferrite powder. Therefore, a thermal expansion coefficient of the dielectric body portion and a thermal expansion coefficient of the magnetic body portion are different from each other. Therefore, if the dielectric body portion and the magnetic body portion are directly jointed to each other without any intermediate part, the jointed dielectric and magnetic body portions are sintered, and the sintered dielectric and magnetic body portions are cooled, there is a possibility that cracking is generated in a joint area between the dielectric body portion and the magnetic body portion at this cooling stage, and there is a possibility that the dielectric body portion and the magnetic body portion are detached from each other. Thus, in Patent Document 1, glass is used as the material of the intermediate part, which realizes a thermal expansion coefficient of the intermediate part so as to absorb a difference between contraction of the dielectric body portion and contraction of the magnetic body portion at the cooling stage of the sintered dielectric and magnetic body portions.

A composite electronic component is also described in Patent Document 2. The composite electronic component is also formed by jointing a dielectric body portion and a magnetic body portion via an intermediate part. In the composite electronic component as well, plural pairs of electrodes including conductive bodies are provided inside of the dielectric body portion, the dielectric body portion functions as a capacitor, a coil including a conductive body is formed inside of the magnetic body portion, and the magnetic body portion functions as an inductor. The dielectric body portion of the composite electronic component described in Patent Document 2 is formed of ceramic such as $TiO_2$ and $Ba_3O_4$. Meanwhile, the magnetic body portion of the composite electronic component described in Patent Document 2 is formed of magnetic oxide ferrite. Therefore, as well as the composite electronic component described in Patent Document 1, a thermal expansion coefficient of the dielectric body portion and a thermal expansion coefficient of the magnetic body portion are different from each other in the composite electronic component described in Patent Document 2. Thus, in Patent Document 2, a material in which one of glass, alumina, and ferrite is mixed with a material of the dielectric body portion is used as a material of the intermediate part, which realizes a thermal expansion coefficient of the intermediate part so as to absorb a difference between contraction of the dielectric body portion and contraction of the magnetic body portion at the cooling stage of the sintered dielectric and magnetic body portions.

A composite electronic component is also described in Patent Document 3 (JP4020886B). The composite electronic component is also formed by jointing a dielectric body portion and a magnetic body portion via an intermediate part. In the composite electronic component as well, plural pairs of electrodes including conductive bodies are provided inside of the dielectric body portion, the dielectric body portion functions as a capacitor, a coil including a conductive body is formed inside of the magnetic body portion, and the magnetic body portion functions as an inductor. The dielectric body portion of the composite electronic component described in Patent Document 3 is formed of Ti ceramic, for example. Meanwhile, the magnetic body portion of the composite electronic component described in Patent Document 3 is formed of Ni—Cu—Zn magnetic ferrite, for example. Therefore, as well as the composite electronic component described in Patent Document 1, a thermal expansion coefficient of the dielectric body portion and a thermal expansion coefficient of the magnetic body portion are different from each other in the composite electronic component described in Patent Document 3. Thus, in Patent Document 3, Fe—Zn—Cu nonmagnetic ferrite and zinc borosilicate glass are used as materials of the intermediate part, which realizes a thermal expansion coefficient of the intermediate part so as to absorb a difference between contraction of the dielectric body portion and contraction of the magnetic body portion at the cooling stage of the sintered dielectric and magnetic body portions.

In such a way, in Patent Documents 1 to 3, for jointing the dielectric and magnetic body portions having different thermal expansion coefficients from each other, the dielectric body portion and the magnetic body portion are jointed via the intermediate part having the thermal expansion coefficient so as to absorb the difference between the contraction of the dielectric body portion and the contraction of the magnetic body portion at the cooling stage of the sintered dielectric and magnetic body portions, so that the dielectric body portion and the magnetic body portion are favorably jointed.

CITATION LIST

Patent Literature

Patent Document 1; JP1983(S58)-172804A
Patent Document 2; JP1984(S59)-33247B
Patent Document 3; JP4020886B

SUMMARY OF INVENTION

In the composite electronic component formed by jointing the dielectric body portion and the magnetic body portion via the intermediate part as described above, when the composite electronic component was sintered, there is sometimes a case where part of the material of the dielectric body portion diffuses inside of the magnetic body portion, part of the material of the magnetic body portion diffuses inside of the dielectric body portion, or part of the material of the intermediate part diffuses inside of the dielectric body portion or inside of the magnetic body portion. Such diffusion may result in an insufficient joint strength between the dielectric body portion and the magnetic body portion via the intermediate part. When part of the material of the dielectric body portion or the intermediate part diffuses inside of the magnetic body portion, a property of the magnetic body portion may be deteriorated. When part of the material of the magnetic body portion or the intermediate part diffuses inside of the dielectric body portion, a property of the dielectric body portion may be deteriorated.

In such a composite electronic component described in Patent Documents 1 and 2 in which there is no countermeasure for suppressing the diffusion of the materials between the dielectric body portion, the magnetic body portion, and the intermediate part, there is a high possibility that the joint strength between the dielectric body portion and the magnetic body portion is not sufficiently ensured as described above. There is also a high possibility that the properties of the dielectric body portion and the magnetic body portion are deteriorated.

Meanwhile, in the composite electric component described in Patent Document 3, by increasing a contained amount of Zn in the intermediate part more than a contained amount of Zn in the magnetic body portion, Zn contained in the magnetic body portion is suppressed from diffusing in the dielectric body portion. That is, according to this, since the contained amount of Zn in the intermediate part placed between the magnetic body portion and the dielectric body portion exceeds the contained amount in the magnetic body portion, Zn contained in the magnetic body portion is suppressed from diffusing in the dielectric body portion, by means of the intermediate part. However, the material to be suppressed from diffusing by the intermediate part is limited to Zn. On the other hand, the dielectric body portion and the magnetic body portion contain materials or elements other than Zn, and such materials or elements cannot be suppressed from diffusing by the intermediate part. Diffusion of such materials or elements between the dielectric body portion and the magnetic body portion may also result in an insufficient joint strength between the dielectric body portion and the magnetic body portion, or deteriorated properties of the dielectric body portion and the magnetic body portion.

An object of the present invention is, in a composite electronic component having a dielectric body portion inside of which a conductive body is provided, and a magnetic body portion inside of which a conductive body is provided, to suppress a material or an element of a part surrounding the conductive body of the dielectric body portion from diffusing inside of the magnetic body portion, or to suppress a material or an element of a part surrounding the conductive body of the magnetic body portion from diffusing inside of the dielectric body portion.

The invention of the present application relates to a composite electronic component having a dielectric body portion inside of which a conductive body is provided, and a magnetic body portion inside of which a conductive body is provided. In the present invention, a layer made of a metal material is arranged between the dielectric body portion and the magnetic body portion as an intermediate layer.

According to this, at the time of sintering the composite electronic component of the present invention, even when a material or an element of a part surrounding the conductive body of the dielectric body portion (hereinafter, the material and the element are collectively called the "dielectric body material") diffuses inside of the magnetic body portion, such diffusion is suppressed by the above intermediate layer. That is, the dielectric body material is suppressed from diffusing inside of the magnetic body portion. At the time of sintering the composite electronic component of the present invention, even when a material or an element of a part surrounding the conductive body of the magnetic body portion (hereinafter, the material and the element are collectively called the "magnetic body material") diffuses inside of the dielectric body portion, such diffusion is suppressed by the above intermediate layer. That is, the magnetic body material is suppressed from diffusing inside of the dielectric body portion. This further ensures a sufficiently high joint strength between the dielectric body portion and the magnetic body portion, and sufficiently enhanced properties of the dielectric body portion and the magnetic body portion.

In the above invention, the intermediate layer is made of the same material or the same element as a material or an element of the conductive body of the dielectric body portion, or the same material or the same element as a material or an element of the conductive body of the magnetic body portion.

According to this, the intermediate layer is formed of the same material or the same element as the material or the element of the conductive body of the dielectric body portion, or the same material or the same element as the material or the element of the conductive body of the magnetic body portion; which facilitates manufacturing of the composite electronic component of the present invention.

In the above invention, the conductive body of the dielectric body portion and the conductive body of the magnetic body portion are formed of the same material or the same element.

According to this, the material or the element of the intermediate layer is the same as the material or the element of the conductive body of the dielectric body portion, and the material or the element of the conductive body of the magnetic body portion; which facilitates manufacturing of the composite electronic component of the present invention.

In the above invention, a layer formed of a material having a higher joint strength to the dielectric body portion and the intermediate layer than a predetermined strength is arranged between the dielectric body portion and the intermediate layer as a joint layer, or a layer formed of a material having a higher joint strength to the magnetic body portion and the intermediate layer than a predetermined strength is arranged between the magnetic body portion and the intermediate layer as a joint layer.

According to this, in the case where the joint layer formed of the material having a higher joint strength to the dielectric body portion and the intermediate layer than a predetermined strength is arranged between the dielectric body portion and the intermediate layer, the joint strength between the joint layer and the dielectric body portion and the intermediate layer is relatively high, even if joint strength between the intermediate layer and the dielectric body portion is low and thus joint strength between the dielectric body portion and the magnetic body portion via the intermediate layer is low; which ensures a relatively high joint strength between the dielectric body portion and the magnetic body portion via the joint layer. Meanwhile, in the case where the joint layer formed of the material having a higher joint strength to the magnetic body portion and the intermediate layer than a predetermined strength is arranged between the dielectric body portion and the magnetic body portion, joint strength between the joint layer and the magnetic body portion and the intermediate layer is relatively high, even if joint strength between the intermediate layer and the magnetic body portion is low and thus the joint strength between the dielectric body portion and the magnetic body portion via the intermediate layer is low; which ensures a relatively high joint strength between the dielectric body portion and the magnetic body portion via the joint layer.

DETAILED DESCRIPTION OF THE INVENTION

1. First Embodiment

Figure 1:
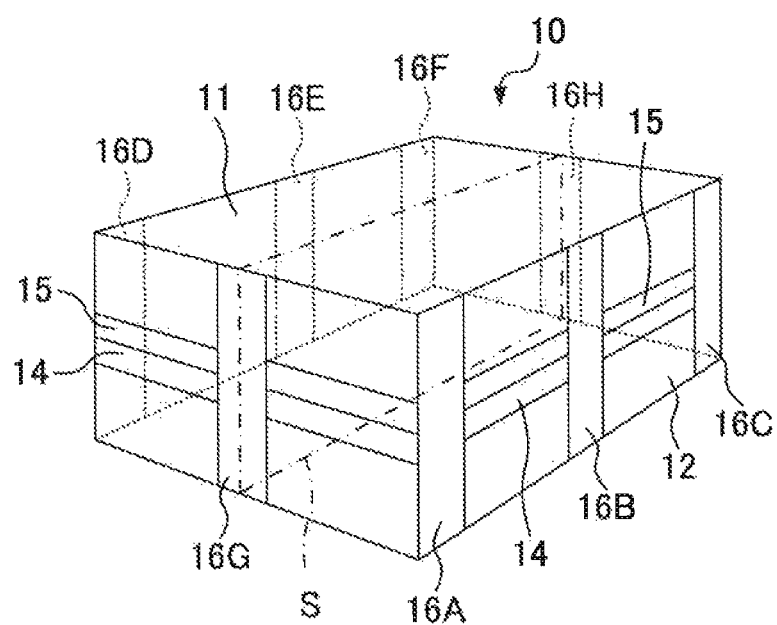
FIG. 1 is a perspective view of a composite electronic component of a first embodiment.
Figure 2:
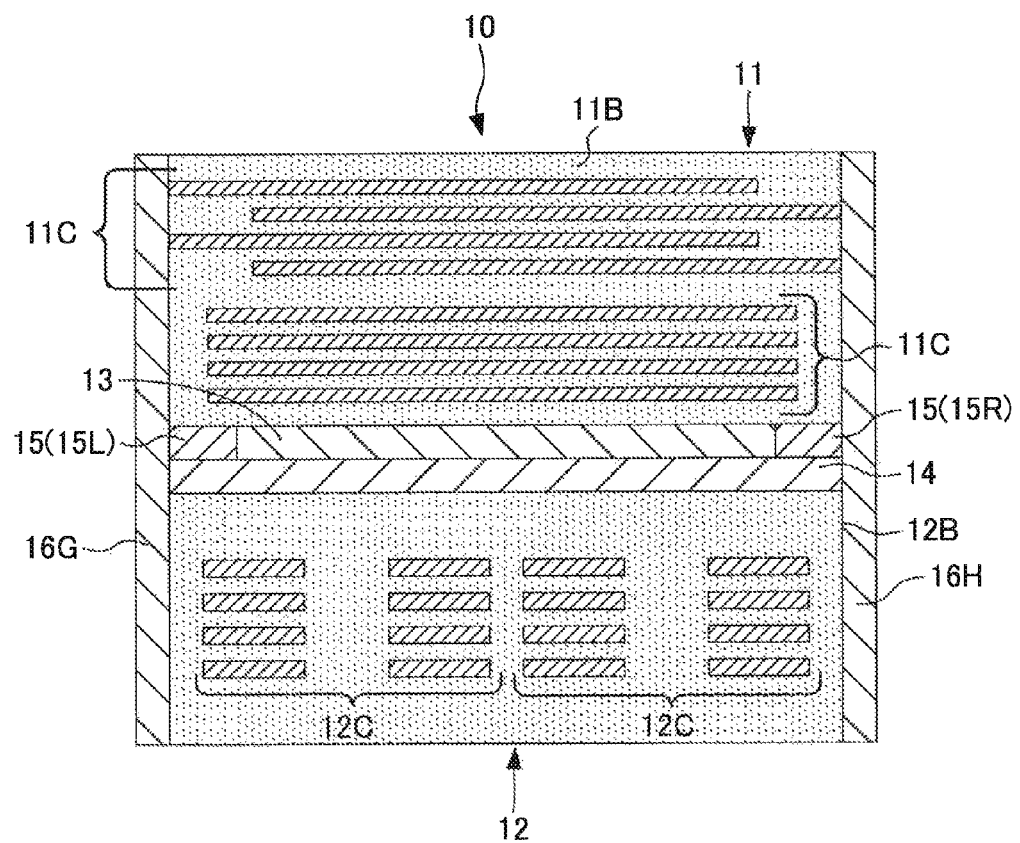
FIG. 2 is a vertically sectional view of the composite electronic component of the first embodiment along a plane shown by a one-chain line S of FIG. 1.

Hereinafter, embodiments of a composite electronic component of the present invention will be described. One embodiment of the composite electronic component of the present invention (hereinafter, the "first embodiment") is shown in a perspective view of FIG. 1 and a vertically sectional view of FIG. 2. In FIGS. 1 and 2, the reference numeral 10 denotes a composite electronic component of the first embodiment. As shown in FIG. 1, the composite electronic component 10 has a rectangular parallelepiped shape. As shown in FIGS. 1 and 2, the composite electronic component 10 has a dielectric body portion 11, a magnetic body portion 12, an intermediate layer 13, a first joint layer 14, a second joint layer 15, and external electrodes 16A to 16H as constituent elements thereof. The dielectric body portion 11 and the magnetic body portion 12 have a rectangular parallelepiped shape. The intermediate layer 13 and the first joint layer 14 also have a rectangular parallelepiped shape, and thickness of these layers is relatively small, it can also be considered that the layers have a plate shape. The second joint layer 15 has a plate shape surrounding a circumference of the intermediate layer 13.

Next, the above constituent elements of the composite electronic component 10 will be described in detail. For the purpose of convenience, an upper part seen on a paper plane of FIG. 2 is referred to as the "upper side". Similarly, a lower part is the "lower side", a left part is the "left side", and a right part is the "right side", in the following description.

As shown in FIG. 2, the dielectric body portion 11 has a plurality of conductive bodies 11C, and a main body 11B. The main body 11B surrounds the conductive bodies 11C. In other words, the conductive bodies 11C are arranged inside of the main body 11B, that is, inside of the dielectric body portion 11. The conductive bodies 11C have a plate shape. The conductive bodies 11C are arranged in parallel to each other, and plural pairs of the conductive bodies are connected to predetermined external terminals, respectively. Therefore, the dielectric body portion 11 functions as a capacitor. That is, a plurality of capacitors is formed inside of the dielectric body portion 11, and the capacitors are connected to the predetermined external terminals, respectively.

The main body 11B of the dielectric body portion 11 is formed of a dielectric body material such as a $BaTiO_3$-based dielectric body material and a $TiO_2$-based dielectric body material. The conductive bodies 11C of the dielectric body portion 11 are formed of a metal material such as Ag and Cu, that is, a conductive body material.

As shown in FIG. 2, the magnetic body portion 12 has a plurality of conductive bodies 12C, and a main body 12B. The main body 12B surrounds the conductive bodies 12C. In other words, the conductive bodies 12C are arranged inside of the main body 12B, that is, inside of the magnetic body portion 12. The conductive bodies 12C have a coil shape. In the conductive bodies 12C, ends of the coils are exposed onto wall surfaces of the magnetic body portion 12. In one example, one ends of the conductive bodies 12C forming the coils are connected to the electrode 16A or 16C, and the other ends are connected to the electrode 16D or 16F. Therefore, the magnetic body portion 12 functions as an inductor. That is, a plurality of inductors is formed inside of the magnetic body portion 12, and the inductors are respectively connected to predetermined external terminals.

The main body 12B of the magnetic body portion 12 is formed of a magnetic material such as a Ni—Cu—Zn-based ferrite material and a Mn—Zn-based ferrite material. The conductive bodies 12C of the magnetic body portion 12 are formed of a metal material such as Ag and Cu, that is, a conductive body material.

As shown in FIG. 2, the intermediate layer 13 is arranged between the dielectric body portion 11 and the first joint layer 14 and surrounded by the second joint layer 15. In FIG. 2, a part of the second joint layer 15 on the left side of the intermediate layer 13 is referred to as the "left part of the second joint layer" and denoted by the reference numeral 15L, and a part of the second joint layer 15 on the right side of the intermediate layer 13 is referred to as the "right part of the second joint layer" and denoted by the reference numeral 15R. When seen in FIG. 2, it can also be considered that the intermediate layer 13 is arranged between the dielectric body portion 11, the first joint layer 14, the left part 15L of the second joint layer, and the right part 15R of the second joint layer. An entire upper wall surface of the intermediate layer 13 is in contact with part of a lower wall surface of the main body 11B of the dielectric body portion 11, an entire lower wall surface thereof is in contact with part of an upper wall surface of the first joint layer 14, and entire end surfaces thereof are in contact with entire inner end surfaces of the second joint layer 15. That is, the upper wall surface of the intermediate layer 13 is in contact with only an area of the lower wall surface of the main body 11B of the dielectric body portion 11 excluding an area close to wall surfaces of the dielectric body portion 11. The lower wall surface of the intermediate layer 13 is in contact with only an area of the upper wall surface of the first joint layer 14 excluding an area close to the wall surfaces of the dielectric body portion 11. Since the entire outer end surfaces of the intermediate layer 13 are in contact with the inner end surfaces of the second joint layer 15, the intermediate layer 13 is not exposed onto wall surfaces of the composite electronic component 10 in no contact with the external terminal electrodes 16A to 16H. The intermediate layer 13 is formed of a metal material such as Ag and Cu.

As shown in FIG. 2, the first joint layer 14 is arranged between the intermediate layer 13, the second joint layer 15, and the magnetic body portion 12. Part of the upper wall surface of the first joint layer 14 is in contact with the entire lower wall surface of the intermediate layer 13 and an entire lower wall surface of the second joint layer 15, and an entire lower wall surface thereof is in contact with an entire upper wall surface of the main body 12B of the magnetic body portion 12. That is, a peripheral area of the upper wall surface of the first joint layer 14 is in contact with the entire lower wall surface of the second joint layer 15, and an area excluding the peripheral area is in contact with the entire lower wall surface of the intermediate layer 13. End surfaces of the first joint layer 14 are exposed onto the wall surfaces of the composite electronic component 10 in contact with the external terminal electrodes 16A to 16H. The first joint layer 14 is formed of a material in which a dielectric body material such as a Ba—Ti—Zn-based dielectric body material, glass such as zinc borosilicate glass, and CuO are mixed.

As shown in FIG. 2, the second joint layer 15 is arranged between the dielectric body portion 11 and the first joint layer 14 and surrounds the intermediate layer 13. An entire upper wall surface of the second joint layer 15 is in contact with part of the lower wall surface of the main body 11B of the dielectric body portion 11, the entire inner end surfaces thereof are in contact with the entire outer end surfaces of the intermediate layer 13, and the entire lower wall surface thereof is in contact with part of the upper wall surface of the first joint layer 14. Outer end surfaces of the second joint layer 15 are exposed onto the wall surfaces of the composite electronic component 10 in contact with the external terminal electrodes 16A to 16H. The second joint layer 15 is formed of a material in which a dielectric body material such as a Ba—Ti—Zn-based dielectric body material, glass such as zinc borosilicate glass, and CuO are mixed. That is, the second joint layer 15 is formed of the material having the same composition as the material of the first joint layer 14. However, a ratio of the dielectric body material, a ratio of glass, and a ratio of CuO in the material of the second joint layer 15 may be respectively the same as corresponding ratios in the material of the first joint layer 14, or the ratio of glass and the ratio of CuO in the material of the second joint layer 15 may be respectively larger than the corresponding ratios in the material of the first joint layer 14.

The composite electronic component 10 of the first embodiment is manufactured by assembling the dielectric body portion 11, the magnetic body portion 12, the intermediate layer 13, the first joint layer 14, and the second joint layer 15 in the positional relationship described above so as to produce a laminated body, sintering the laminated body so as to produce a sintered body, and forming the external electrodes 16A to 16H in the sintered body.

During sintering of the above laminated body, part of a material or an element of the main body 11B of the dielectric body portion 11 (hereinafter, the material and the element are collectively called the "dielectric body material") is apt to diffuse inside of the magnetic body portion 12. Without the intermediate layer 13, the dielectric body material diffuses inside of the magnetic body portion 12 through the first joint layer 14. Then, the diffused material lowers joint strength between the first joint layer 14 and the magnetic body portion 12 in the finally manufactured composite electronic component 10, and also lowers an electric property of the magnetic body portion 12 in the finally manufactured composite electronic component 10. Further, a composition of the dielectric body portion 11 is also changed by element diffusion, and thus a sintering property and an electric property of the dielectric body portion 11 are also deteriorated. In an experiment in which, without the intermediate layer 13 (thus without the second joint layer 15 as well), only the first joint layer 14 is arranged between the dielectric body portion 11 and the magnetic body portion 12 to sinter a laminated body including the dielectric body portion 11, the magnetic body portion 12, and the first joint layer 14; a large number of pores were found in both the magnetic body portion 12 and the first joint layer 14, the joint strength between the first joint layer 14 and the magnetic body portion 12 was low, and the electric properties of the dielectric body portion 11 and the magnetic body portion 12 were deteriorated. It is presumed that a large number of pores were found in such a way, because the dielectric body material diffused inside of the first joint layer 14 and the magnetic body portion 12, which results in an insufficient sintering of the material of the first joint layer 14 and a material of the main body 12B of the magnetic body portion 12.

However, in the first embodiment, the intermediate layer 13 is provided, and the intermediate layer 13 is formed of a metal material. That is, the intermediate layer 13 has a structure of metal bond, and thus the dielectric body material cannot diffuse in the intermediate layer 13. As a result, diffusion of the dielectric body material inside of the magnetic body portion 12 via the first joint layer 14 is suppressed. Therefore, a sufficiently high joint strength is ensured between the first joint layer 14 and the magnetic body portion 12 in the finally manufactured composite electronic component 10 (and eventually, joint strength between the dielectric body portion 11 and the magnetic body portion 12), and sufficiently enhanced electric properties of the dielectric body portion 11 and the magnetic body portion 12 are ensured. In an experiment in which the laminated body including the dielectric body portion 11, the magnetic body portion 12, the first joint layer 14, the second joint layer 15, and the intermediate layer 13 was sintered according to the first embodiment, few pores were found in the magnetic body portion 12 and the first joint layer 14, the joint strength between the first joint layer 14 and the magnetic body portion 12 was high, and the electric properties of the dielectric body portion 11 and the magnetic body portion 12 were enhanced.

Meanwhile, during sintering of the above laminated body, part of the material or an element of the main body 12B of the magnetic body portion 12 (hereinafter, the material and the element are collectively called the "magnetic body material") is apt to diffuse inside of the dielectric body portion 11. Without the intermediate layer 13, the magnetic body material diffuses inside of the dielectric body portion 11 through the first joint layer 14. Then, the diffused magnetic body material lowers joint strength between the first joint layer 14 and the dielectric body portion 11 in the finally manufactured composite electronic component 10 (without the intermediate layer 13, the second joint layer 15 is not provided as well, and thus the upper wall surface of the first joint layer 14 is in direct contact with a lower wall surface of the dielectric body portion 11), and also lowers the electric property of the dielectric body portion 11 in the finally manufactured composite electronic component 10. Further, a composition of the magnetic body portion 12 is also changed by element diffusion, so that a sintering property and the electric property of the magnetic body portion 12 are also deteriorated. In an experiment in which, without the intermediate layer 13 (thus without the second joint layer 15 as well), only the first joint layer 14 is arranged between the dielectric body portion 11 and the magnetic body portion 12 to sinter a laminated body including the dielectric body portion 11, the magnetic body portion 12, and the first joint layer 14; a large number of pores were found both in the dielectric body portion 11 and the first joint layer 14, the joint strength between the first joint layer 14 and the dielectric body portion 11 was low, and the electric properties of the dielectric body portion 11 and the magnetic body portion 12 were deteriorated. It is presumed that a large number of pores were found in such a way, because the magnetic body material diffused inside of the first joint layer 14 and the dielectric body portion 11, which results in an insufficient sintering of the material of the first joint layer 14 and the material of the main body 11B of the dielectric body portion 11.

However, in the first embodiment, the intermediate layer 13 is provided, and the intermediate layer 13 is formed of a metal material. That is, the intermediate layer 13 has a structure of metal bond, and thus the magnetic body material cannot diffuse in the intermediate layer 13. As a result, diffusion of the magnetic body material inside of the dielectric body portion 11 via the first joint layer 14 is suppressed. Therefore, a sufficiently high joint strength is ensured between the first joint layer 14 and the dielectric body portion 11 via the intermediate layer 13 in the finally manufactured composite electronic component 10 (and eventually, the joint strength between the magnetic body portion 12 and the dielectric body portion 11), and sufficiently enhanced electric properties of the dielectric body portion 11 and the magnetic body portion 12 are ensured. In an experiment in which the laminated body including the dielectric body portion 11, the magnetic body portion 12, the first joint layer 14, the second joint layer 15, and the intermediate layer 13 was sintered according to the first embodiment, few pores were found in the dielectric body portion 11 and the first joint layer 14, joint strength between the first joint layer 14 and the intermediate layer 13 and joint strength between the intermediate layer 13 and the dielectric body portion 11 were high, and the electric properties of the dielectric body portion 11 and the magnetic body portion 12 were enhanced.

Since the material of the conductive bodies 11C of the dielectric body portion 11 (that is, the conductive body material of the dielectric body portion) and the material of the conductive bodies 12C of the magnetic body portion 12 (that is, the conductive body material of the magnetic body portion) are the same in the first embodiment, the material of the intermediate layer 13 is the same as both the conductive body material of the dielectric body portion and the conductive body material of the magnetic body portion. However, the thought included in the first embodiment can also be applied to the case where the conductive body material of the dielectric body portion and the conductive body material of the magnetic body portion are different from each other, to obtain a certain effect. In detail, in the case where the conductive body material of the dielectric body portion and the conductive body material of the magnetic body portion are different from each other, the intermediate layer 13 may be formed of the same material as the conductive body material of the dielectric body portion, or the intermediate layer 13 may be formed of the same material as the conductive body material of the magnetic body portion.

In the case where at least one of the material of the main body 11B of the dielectric body portion 11, the material of the conductive bodies 11C of the dielectric body portion 11, the material of the main body 12B of the magnetic body portion 12, the material of the conductive bodies 12C of the magnetic body portion 12, and the material of the first joint layer 14 is different from the materials of the first embodiment, the thought included in the first embodiment can be applied to obtain a certain effect. In this case, not only a certain effect can be obtained in the joint strength between the dielectric body portion 11 and the magnetic body portion 12 and the electric properties of the dielectric body portion 11 and the magnetic body portion 12, but also a certain effect may also be obtained in properties other than the electric properties of the dielectric body portion 11 and the magnetic body portion 12.

Although it may depend on the material of the main body 11B of the dielectric body portion 11, the material of the conductive bodies 11C of the dielectric body portion 11, the material of the main body 12B of the magnetic body portion 12, the material of the conductive bodies 12C of the magnetic body portion 12, and the material of the first joint layer 14, in the case where a positional relationship between the intermediate layer 13 and the first joint layer 14 is opposite to the positional relationship of the first embodiment, the thought included in the first embodiment can be applied to obtain a certain effect. That is, in the case where the first joint layer 14 is arranged between the dielectric body portion 11, the intermediate layer 13, as well as the second joint layer 15, and the intermediate layer 13 is arranged between the first joint layer 14 and the magnetic body portion 12 and surrounded by the second joint layer 15, the thought included in the first embodiment can be applied to obtain a certain effect.

In the case where another joint layer is arranged between the first joint layer 14 and the magnetic body portion 12, the thought included in the first embodiment is applied, and thereby, a certain effect can also be obtained.

Although it may depend on the material of the main body 11B of the dielectric body portion 11, the material of the conductive bodies 11C of the dielectric body portion 11, the material of the main body 12B of the magnetic body portion 12, and the material of the conductive bodies 12C of the magnetic body portion 12, in the case where, without the first joint layer 14, the intermediate layer 13 is arranged between the dielectric body portion 11 and the magnetic body portion 12 and surrounded by the second joint layer 15, the thought included in the first embodiment can be applied to obtain a certain effect.

In the first embodiment, the intermediate layer 13 is formed of a metal material, and the intermediate layer 13 has a conductive property. Thus, there is a need for preventing the intermediate layer 13 from being in contact with the external electrodes 16A to 16H. Further, it is preferable for the intermediate layer 13 not to be exposed to an external environment. Therefore, the second joint layer 15 surrounds the intermediate layer 13. However, as long as the elements and the external electrodes are formed in a manner that the intermediate layer 13 is prevented from being in contact with the external electrodes 16A to 16H, or as long as there is no need for preventing the intermediate layer 13 from being exposed to the external environment, the second joint layer 15 is not necessary.

The intermediate layer 13 serves to suppress the dielectric body material (that is, the material of the main body 11B of the dielectric body portion 11) from diffusing inside of the magnetic body portion 12, and suppressing the magnetic body material (that is, the material of the main body 12B of the magnetic body portion 12) from diffusing inside of the dielectric body portion 11. Thus, it can be considered that the intermediate layer 13 serves as a diffusion suppressing layer.

Of course, since the intermediate layer 13 is a metal material having a plastic deformation property, the intermediate layer also serves to absorb a difference between a contraction rate of the dielectric body portion 11 and a contraction rate of the magnetic body portion 12 when the sintered body is cooled after sintering the above laminated body, which suppresses cracking in the cooled sintered body. It is preferable for the first joint layer 14 and the second joint layer 15 to have a thermal expansion coefficient which is in a middle between the dielectric body portion 11 and the magnetic body portion 12 so as to absorb the difference between the contraction rates of both the portions. Or, it is preferable to select material(s) to constitute the first joint layer 14 and the second joint layer 15 in a manner that the first joint layer 14 and the second joint layer 15 as well can serve to absorb the difference.

In the first embodiment, as the material of the intermediate layer 13, the material of the conductive bodies 11C of the dielectric body portion 11 is used, or the material of the conductive bodies 12C of the magnetic body portion 12 is used. However, for the material of the intermediate layer 13, depending on a property desired in the intermediate layer 13, a metal material other than the material of the conductive bodies 11C of the dielectric body portion 11 or the conductive bodies 12C of the magnetic body portion 12, or the material of the conductive bodies 11C of the dielectric body portion 11 and a material other than the material may be used, or the material of the conductive bodies 12C of the magnetic body portion 12 and a material other than the material may be used.

Specific examples of materials adoptable as the material of the main body 11B of the dielectric body portion 11, the material of the main body 12B of the magnetic body portion 12, the material of the first joint layer 14, and the material of the second joint layer 15 according to the first embodiment include the followings. That is, as the material of the main body 11B of the dielectric body portion 11, a $BaTiO_3$-based dielectric body material primarily including 45 to 50 mol % of BaO and 45 to 50 mol % of $TiO_2$, and secondarily including 0.5 to 2 mol % of ZnO, 0.1 to 0.5 mol % of MnO, 2 to 5 mol % of CuO, and 1 to 3 mol % of $Bi_2O_3$ can be adopted. At this time, as the material of the main body 12B of the magnetic body portion 12, a Ni—Cu—Zn-based ferrite material primarily including 46 to 49 mol % of $Fe_2O_3$, 16 to 32 mol % of ZnO, 10 to 24 mol % of NiO, and 7 to 12 mol % of CuO, and secondarily including 0.1 to 1 mol % of $MnO_2$ can be adopted. At this time, as the material of the first joint layer 14, a mixture in which when a Ba—Ti—Zn-based dielectric body material primarily including 8 to 12 mol % of BaO, 53 to 57 mol % of $TiO_2$, and 30 to 35 mol % of ZnO, and secondarily including 0.5 to 2 mol % of MnO, 0 to 0.5 mol % of $Al_2O_3$, 0 to 0.1 mol % of $ZrO_2$, 0 to 0.01 mol % of $Fe_2O_3$, and 0 to 0.01 mol % of $SiO_2$ is taken as 100 weight %; 2.5 to 5 weight % of zinc borosilicate glass including 61 to 65 weight % of ZnO, 25 to 30 weight % of $B_2O_3$, 7 to 9 weight % of $SiO_2$, and 0.1 to 0.5 weight % of $Al_2O_3$ is added to this material, and 6 to 10 weight % of CuO is added, can be adopted. At this time, as the material of the second joint layer 15, a mixture in which when a dielectric body material having the same composition as the Ba—Ti—Zn-based dielectric body material described in connection with the first joint layer 14 is taken as 100 weight %; 2.5 to 7.5 weight % of zinc borosilicate glass having the same composition as the zinc borosilicate glass described in connection with the first joint layer 14 is added to this material, and 6 to 12 weight % of CuO is added, can be adopted.

In view of the first embodiment, it can also be considered that when the intermediate layer 13 formed of the same material or the same element as the material or the element of the conductive bodies 11C of the dielectric body portion 11 is arranged between the dielectric body portion 11 and the magnetic body portion 12, or the intermediate layer 13 formed of the same material or the same element as the material or the element of the conductive bodies 12C of the magnetic body portion 12 is arranged between the dielectric body portion 11 and the magnetic body portion 12, a sufficiently high joint strength is ensured between the dielectric body portion 11 and the magnetic body portion 12, and sufficiently enhanced electric properties of the dielectric body portion 11 and the magnetic body portion 12 are ensured. From this view, it can be considered that, even without the intermediate layer 13 (thus without the second joint layer 15 as well), one of the conductive bodies 11C of the dielectric body portion 11 is exposed onto the lower wall surface of the dielectric body portion 11 (that is, the lower wall surface of the dielectric body portion 11 is formed by a lower wall surface of the conductive body 11C), and the first joint layer 14 and the magnetic body portion 12 are provided in a manner that the upper wall surface of the first joint layer 14 is in contact with the lower wall surface of the conductive body 11C and an upper wall surface of the magnetic body portion 12 is in contact with the lower wall surface of the first joint layer 14; the conductive body 11C exposed onto the lower wall surface of the dielectric body portion 11 serves as the intermediate layer 13, which ensures a sufficiently high joint strength between the dielectric body portion 11 and the magnetic body portion 12 and sufficiently enhanced electric properties of the dielectric body portion 11 and the magnetic body portion 12.

2. Second Embodiment

Figure 3:
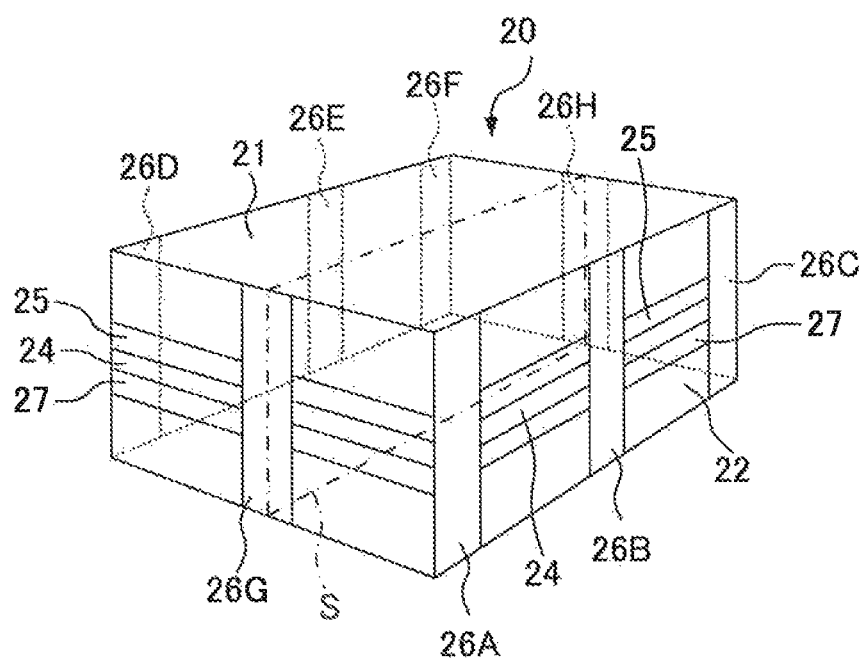
FIG. 3 is a perspective view of a composite electronic component of a second embodiment.
Figure 4:
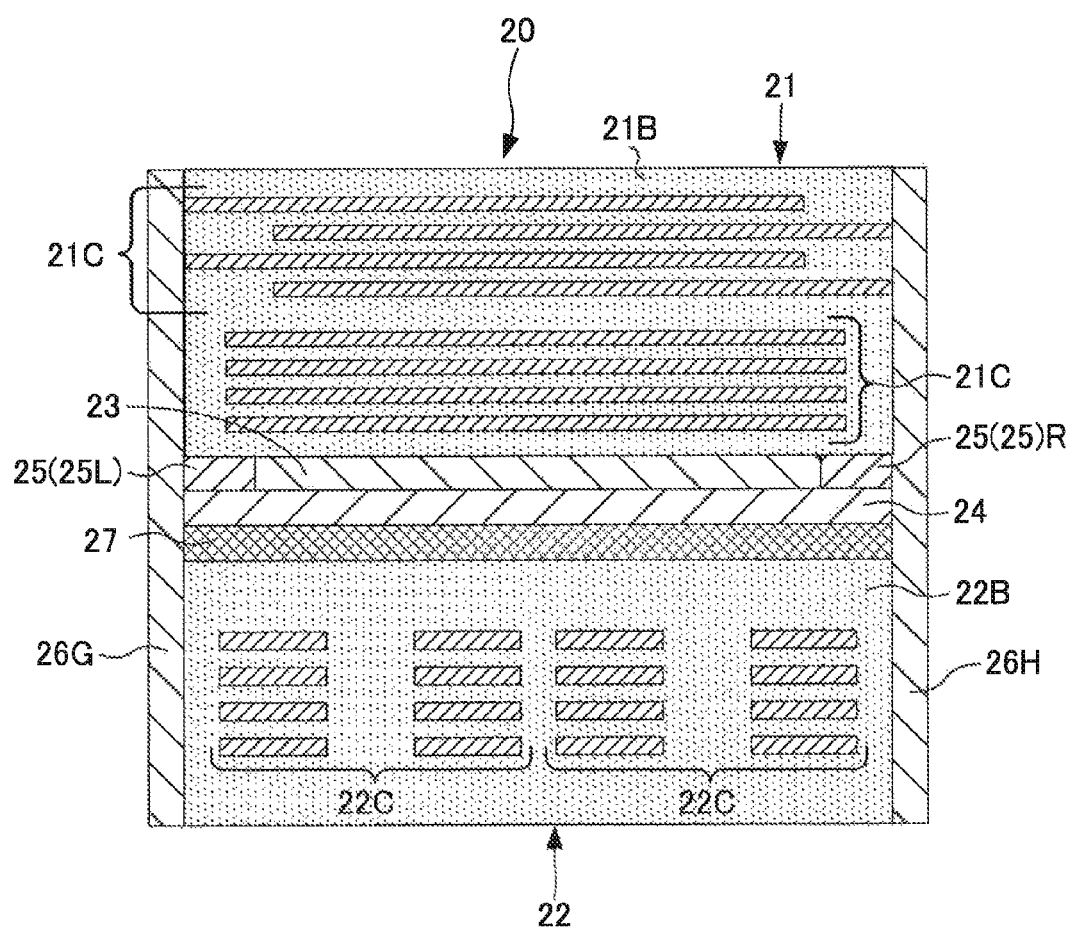
FIG. 4 is a vertically sectional view of the composite electronic component of the second embodiment along a plane shown by a one-chain line S of FIG. 3.

Next, a composite electronic component of an embodiment in which the present invention is applied to the case where another joint layer is arranged between the first joint layer 14 and the magnetic body portion 12 in the first embodiment (hereinafter, the "second embodiment") will be described. The composite electronic component of the second embodiment is shown in a perspective view of FIG. 3 and a vertically sectional view of FIG. 4. In FIGS. 3 and 4, the reference numeral 20 denotes a composite electronic component of the second embodiment. As shown in FIG. 3, the composite electronic component 20 has a rectangular parallelepiped shape. As shown in FIGS. 3 and 4, the composite electronic component 20 has a dielectric body portion 21, a magnetic body portion 22, an intermediate layer 23, a first joint layer 24, a second joint layer 25, a third joint layer 27, and external electrodes 26A to 26H as constituent elements thereof. The dielectric body portion 21 and the magnetic body portion 22 have a rectangular parallelepiped shape. The intermediate layer 23, the first joint layer 24, and the third joint layer 27 also have a rectangular parallelepiped shape. However, since thickness of these layers is relatively small, it can also be considered that the layers have a plate shape. The second joint layer 25 has a plate shape surrounding a circumference of the intermediate layer 23.

Next, the above constituent elements of the composite electronic component 20 will be described in detail. For the purpose of convenience, an upper part seen on a paper plane of FIG. 4 is referred to as the "upper side". Similarly, a lower part is the "lower side", a left part is the "left side", and a right part is the "right side" in the following description.

As shown in FIG. 4, the dielectric body portion 21 has a plurality of conductive bodies 21C, and a main body 21B. A configuration of the conductive bodies 21C is the same as the configuration of the conductive bodies 11C of the first embodiment, and a configuration of the main body 21B is the same as the configuration of the main body 11B of the first embodiment. Thus, further description of the conductive bodies 21C and the main body 21B will be omitted.

As shown in FIG. 4, the magnetic body portion 22 has a plurality of conductive bodies 22C, and a main body 22B. A configuration of the conductive bodies 22C is the same as the configuration of the conductive bodies 12C of the first embodiment, and a configuration of the main body 22B is the same as the configuration of the main body 12B of the first embodiment. Thus, further description of the conductive bodies 22C and the main body 22B will be omitted.

As shown in FIG. 4, the intermediate layer 23 is arranged between the dielectric body portion 21 and the first joint layer 24 and also surrounded by the second joint layer 25. Other configuration of the intermediate layer 23 is the same as the configuration of the intermediate layer 13 of the first embodiment. Thus, further description of the intermediate layer 23 will be omitted.

As shown in FIG. 4, the first joint layer 24 is arranged between the intermediate layer 23, the second joint layer 25, and the third joint layer 27. Part of an upper wall surface of the first joint layer 24 is in contact with an entire lower wall surface of the intermediate layer 23 and an entire lower wall surface of the second joint layer 25, and an entire lower wall surface thereof is in contact with an entire upper wall surface of the third joint layer 27. That is, a peripheral area of the upper wall surface of the first joint layer 24 is in contact with the entire lower wall surface of the second joint layer 25, and an area excluding the peripheral area is in contact with the entire lower wall surface of the intermediate layer 23. End surfaces of the first joint layer 24 are exposed onto wall surfaces of the composite electronic component 20 in contact with the external terminal electrodes 26A to 26H. The first joint layer 24 is formed of a material in which a dielectric body material such as a Ba—Ti—Zn-based dielectric body material, glass such as zinc borosilicate glass, and CuO are mixed.

As shown in FIG. 4, the second joint layer 25 is arranged between the dielectric body portion 21 and the first joint layer 24 and surrounds the intermediate layer 23. Other configuration of the second joint layer 25 is the same as the configuration of the second joint layer 15 of the first embodiment. Thus, further description of the second joint layer 25 will be omitted.

As shown in FIG. 4, the third joint layer 27 is arranged between the first joint layer 24 and the magnetic body portion 22. The entire upper wall surface of the third joint layer 27 is in contact with the entire lower wall surface of the first joint layer 24, and an entire lower wall surface thereof is in contact with an entire upper wall surface of the main body 22B of the magnetic body portion 22. Outer end surfaces of the third joint layer 27 are exposed onto the wall surfaces of the composite electronic component 20 in contact with the external terminal electrodes 26A to 26H. The third joint layer 27 is formed of a mixture of a dielectric body material of the first joint layer 24 and a magnetic material of the main body 22B of the magnetic body portion 22. That is, the third joint layer 27 has a composition in a middle of a composition of the first joint layer 24 and a composition of the main body 22B of the magnetic body portion 22.

Since the third joint layer 27 having the composition in the middle of the compositions of the first joint layer and the magnetic body portion is arranged between the first joint layer 24 and the magnetic body portion 22 in such a way, the first joint layer 24 and the magnetic body portion 22 can be jointed with a further high joint strength.

The composite electronic component 20 of the second embodiment is manufactured by assembling the dielectric body portion 21, the magnetic body portion 22, the intermediate layer 23, the first joint layer 24, the second joint layer 25, and the third joint layer 27 in the positional relationship described above so as to produce a laminated body, sintering the laminated body so as to produce a sintered body, and forming the external electrodes 26A to 26H in the sintered body.

During sintering of the above laminated body, part of a material or an element of the main body 21B of the dielectric body portion 21 (hereinafter, the material and the element are collectively called the "dielectric body material") is apt to diffuse inside of the magnetic body portion 22. However, the dielectric body material cannot diffuse in the intermediate layer 23. As a result, diffusion of the dielectric body material inside of the magnetic body portion 22 via the first joint layer 24 and the third joint layer 27 is suppressed. Therefore, a sufficiently high joint strength is ensured between the first joint layer 24 and the third joint layer 27 and joint strength between the third joint layer 27 and the magnetic body portion 22 in the finally manufactured composite electronic component 20 (and eventually, joint strength between the dielectric body portion 21 and the magnetic body portion 22), and sufficiently enhanced electric properties of the dielectric body portion 21 and the magnetic body portion 22 are ensured.

Meanwhile, during sintering of the above laminated body, part of a material or an element of the main body 22B of the magnetic body portion 22 (hereinafter, the material and the element are collectively called the "magnetic body material") is apt to diffuse inside of the dielectric body portion 21. However, the magnetic body material cannot diffuse in the intermediate layer 23. As a result, diffusion of the magnetic body material inside of the dielectric body portion 21 via the third joint layer 27 and the first joint layer 24 is suppressed. Therefore, a sufficiently high joint strength is ensured between the first joint layer 24 and the dielectric body portion 21 via the intermediate layer 23 in the finally manufactured composite electronic component 20 (and eventually, the joint strength between the magnetic body portion 22 and the dielectric body portion 21), and sufficiently enhanced electric properties of the dielectric body portion 21 and the magnetic body portion 22 are ensured.

In view of the second embodiment, it can also be considered that, when the intermediate layer 23 formed of the same material or the same element as the material or the element of the conductive bodies 21C of the dielectric body portion 21 is arranged between the dielectric body portion 21 and the magnetic body portion 22, or the intermediate layer 23 formed of the same material or the same element as the material or the element of the conductive bodies 22C of the magnetic body portion 22 is arranged between the dielectric body portion 21 and the magnetic body portion 22; a sufficiently high joint strength is ensured between the dielectric body portion 21 and the magnetic body portion 22, and sufficiently enhanced electric properties of the dielectric body portion 21 and the magnetic body portion 22 are ensured. From this view, it can be considered that even if, without the intermediate layer 23 (thus without the second joint layer 25 as well), one of the conductive bodies 21C of the dielectric body portion 21 is exposed onto a lower wall surface of the dielectric body portion 21 (that is, the lower wall surface of the dielectric body portion 21 is formed by a lower wall surface of the conductive body 21C), and the first joint layer 24, the third joint layer 27, and the magnetic body portion 22 are provided in a manner that the upper wall surface of the first joint layer 24 is in contact with the lower wall surface of the conductive body 21C, the upper wall surface of the third joint layer 27 is in contact with the lower wall surface of the first joint layer 24, and an upper wall surface of the magnetic body portion 22 is in contact with the lower wall surface of the third joint layer 27; the conductive body 21C exposed onto the lower wall surface of the dielectric body portion 21 serves as the intermediate layer 23, which ensures a sufficiently high joint strength between the dielectric body portion 21 and the magnetic body portion 22 and sufficiently enhanced electric properties of the dielectric body portion 21 and the magnetic body portion 22.

The intermediate layer 23 serves to suppress the dielectric body material (that is, the material of the main body 21B of the dielectric body portion 21) from diffusing inside of the magnetic body portion 22, and suppress the magnetic body material (that is, the material of the main body 22B of the magnetic body portion 22) from diffusing inside of the dielectric body portion 21. Thus, it can be considered that the intermediate layer 23 serves as a diffusion suppressing layer.

Of course, the intermediate layer 23 is a metal material having a plastic deformation property, and thus the intermediate layer also serves to absorb a difference between a contraction rate of the dielectric body portion 21 and a contraction rate of the magnetic body portion 22 when the sintered body is cooled after sintering the above laminated body, which suppresses cracking in the cooled sintered body. It is preferable for the first joint layer 24, the second joint layer 25, and the third joint layer 27 to have a thermal expansion coefficient which is in a middle between the dielectric body portion 21 and the magnetic body portion 22 so as to absorb the difference between the contraction rates of both the portions. Or, it is preferable to select material(s) to constitute the first joint layer 24, the second joint layer 25, and the third joint layer 27 in a manner that the first joint layer 24, the second joint layer 25, and the third joint layer 27 as well can serve to absorb the difference.

In the second embodiment, as the material of the intermediate layer 23, the material of the conductive bodies 21C of the dielectric body portion 21 is used, or the material of the conductive bodies 22C of the magnetic body portion 22 is used. However, as the material of the intermediate layer 23, depending on a property desired in the intermediate layer 23, a metal material other than the material of the conductive bodies 21C of the dielectric body portion 21 or the conductive bodies 22C of the magnetic body portion 22 may be used, or the material of the conductive bodies 21C of the dielectric body portion 21 and a material other than the material may be used, or the material of the conductive bodies 22C of the magnetic body portion 22 and a material other than the material may be used.

In the composite electronic components of the first embodiment and the second embodiment, the dielectric body portion 11 and the magnetic body portion 12 may be produced by a known tape laminating method or produced by a gel casting method. The gel casting method is a ceramic powder molding method of pouring slurry containing ceramic powder into a mold and hardening or gelatinizing the slurry in the mold, so as to produce a molded body (compact) without flowability. Since a dispersion medium is evaporated after the slurry loses the flowability, the gel casting method has a characteristic that molding contraction is small. Therefore, when the gel casting method is used at the time of burying a thick conductive body into a ceramic compact, a compact can be obtained without damage such as cracking due to molding contraction.

The slurry used in production of the ceramic compact by the gel casting method is prepared by adding a hardening agent, a gelatinizing agent, and the like to the dispersion medium in which the ceramic powder is dispersed. The hardening agent (gelatinizing agent) contains a precursor of a resin hardener (resin gelatinizer), and a hardening initiator/accelerator (gelatinization initiator/accelerator) for initiating or accelerating hardening (gelatinization) of the precursor of the resin hardener.

The dispersion medium is selected from water, a non-polar organic solvent, a polar organic solvent, and the like. The organic solvent selected as the dispersion medium includes lower alcohols such as methanol, ethanol, and isopropyl alcohol, higher alcohol, acetone, hexane, benzene, toluene, and diols such as ethylene glycol, triols such as glycerin, polybasic acid ester such as glutaric dimethyl, esters containing two or more ester groups such as triacetin, polyester compound such as polycarboxylate ester, phosphate ester, amine condensate, nonionic specific amide compound, and the like. The dispersion medium may be any of a pure substance and a mixture.

A resin of the resin hardener is selected from an epoxy resin, an acrylic resin, a urethane resin, and the like. The resin is selected from substances having a high compatibility with the dispersion medium and low reactivity to the dispersion medium. As an epoxy resin, a polymer containing, as constituent monomer(s), ethylene glycol diglycidyl ether, polyethylene glycol diglycidyl ether, propylene glycol diglycidyl ether, polypropylene glycol, glycerol diglycidyl ether, and the like is selected. As an acrylic resin, a polymer containing, as constituent monomer(s), acrylamide, methacrylic acid, N-hydroxymethyl acrylamide, acrylate ammonium salt, and the like is selected. As a urethane resin, a polymer containing, as constituent monomers, MDI (4,4-diphenylmethane diisocyanate) isocyanate, HDI (hexamethylene diisocyanate) isocyanate, TDI (tolylenediisocyanate) isocyanate, IPDI (isophorone diisocyanate) isocyanate, isothiocyanate, and the like is selected.

The hardening initiator/accelerator is selected in consideration with reactivity between the hardening initiator/accelerator and the precursor of the resin hardener. The hardening initiator/accelerator is selected from polyalkylene polyamine of a polymer of tetramethylethylenediamine, triethylenediamine, hexanediamine, ethylenediamine, and the like, perazines such as 1-(2-aminoethyl)piperazine, polyether amine such as polyoxypropylene diamine, N,N'- methylenebisacrylamide, 6-dimethylamino-1-hexanol, ammonium persulfate, hydrogen peroxide, and the like.

For example, a mixture of triacetin and dimethyl glutarate is selected as the dispersion medium, and polymethylenepolyphenyl polyisocyanate and ethylene glycol are selected as the gelatinizing agent. A dispersant such as a carboxylic acid copolymer and an acrylic acid copolymer may further be added to the dispersion medium in order to improve a dispersion property, or a catalyzer such as 6-dimethylamino-1-hexanol may further be added in order to facilitate hardening (gelatinization) reaction.

The gel casting method has a merit that a contained amount of the ceramic powder of a dielectric body and a magnetic body to be contained in the slurry can be adjusted in a wide range. Since sintering contraction amounts at the time of sintering can be controlled by means of the contained amount of the ceramic powder in the slurry, by producing one or both of the dielectric body portion 11 and the magnetic body portion 12 by the gel casting method, the contraction amounts at the time of sintering can be easily matched with each other. Thus, when being sintered, those portions can be suppressed from being detached from each other, so that it is advantageous for integrating those portions.

3. Manufacturing Procedure

Figure 5:
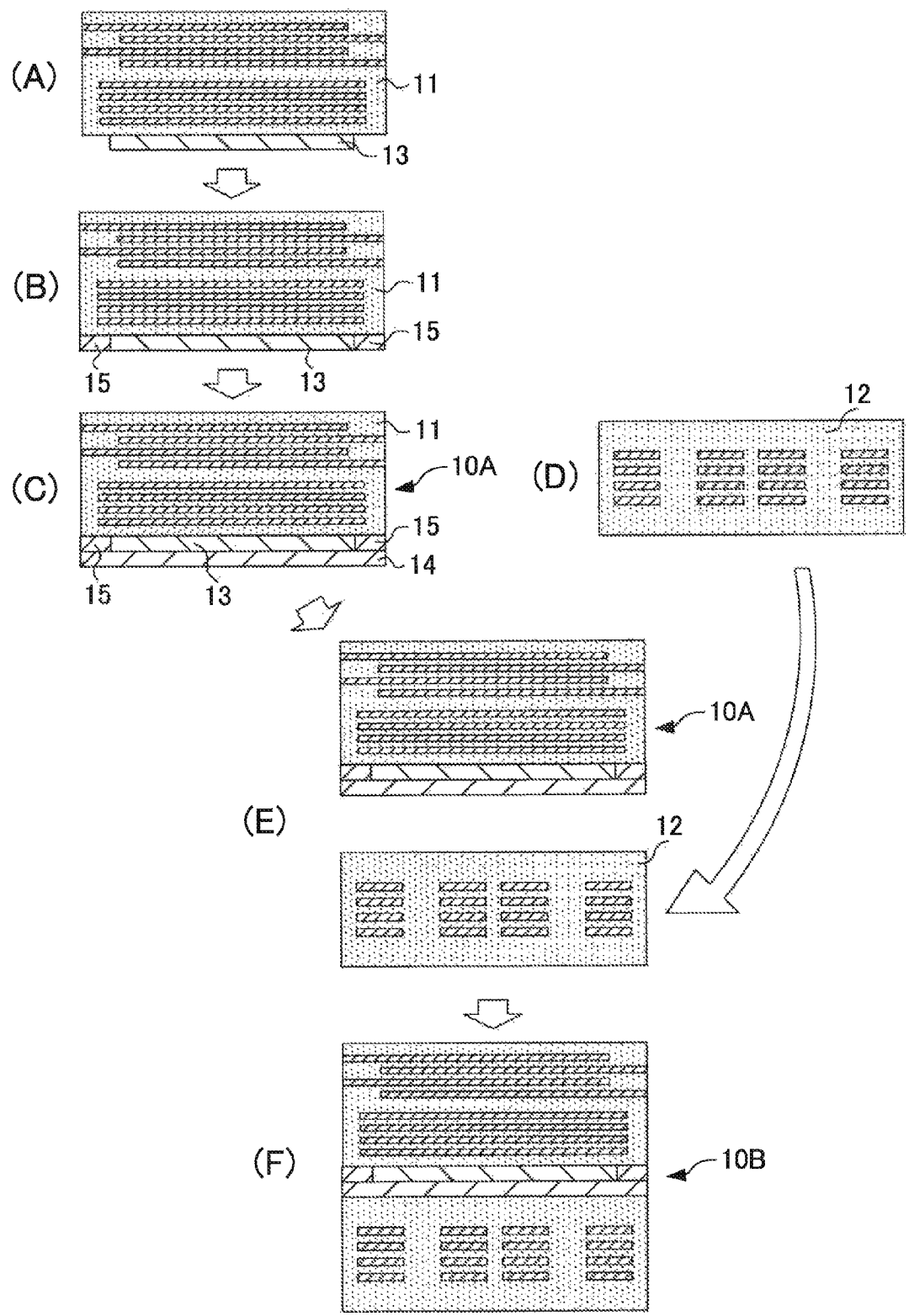
FIG. 5 is a view showing one example of a manufacturing procedure of the composite electronic component of the first embodiment.

Next, one example of a manufacturing procedure of the composite electronic component of the first embodiment will be described. The manufacturing procedure is shown in FIG. 5. As shown in FIG. 5(A), the dielectric body portion 11 is prepared, and the intermediate layer 13 is provided in a predetermined area of the lower wall surface of the dielectric body portion 11 by printing. Next, as shown in FIG. 5(B), the second joint layer 15 is provided in a predetermined area of the lower wall surface of the dielectric body portion 11 by printing. Next, as shown in FIG. 5(C), the first joint layer 14 is provided onto the entire lower wall surface of the intermediate layer 13 and the entire lower wall surface of the second joint layer 15 by printing. Thereby, a partial laminated body 10A is produced. Meanwhile, as shown in FIG. 5(D), the magnetic body portion 12 is prepared. As shown in FIG. 5(E), the partial laminated body 10A and the magnetic body portion 12 are assembled to each other in a manner that an entire lower wall surface of the partial laminated body 10A (more specifically, the entire lower wall surface of the first joint layer 14) and the entire upper wall surface of the magnetic body portion 12 are in contact with each other. By pressing with uniaxial press or CIP (Cold Isostatic Press), a laminated body 10B is produced as shown in FIG. 5(F). Next, the laminated body 10B is cut into individual laminated bodies to each form one final composite electronic component 10. By sintering and then cooling the individual laminated bodies, and providing the external electrodes 16A to 16H, the composite electronic component 10 is manufactured.

Figure 6:
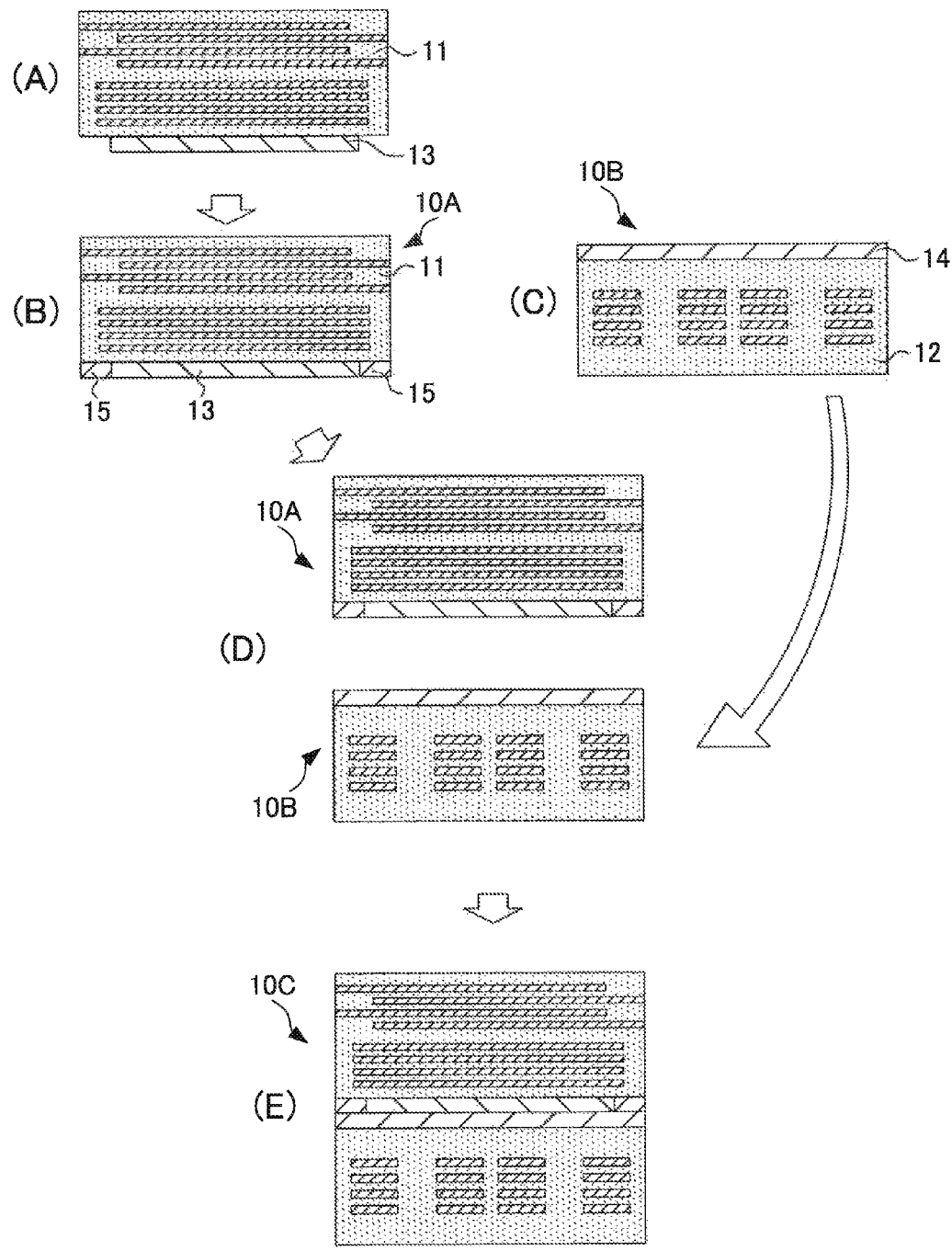
FIG. 6 is a view showing another example of the manufacturing procedure of the composite electronic component of the first embodiment.

Next, another example of the manufacturing procedure of the composite electronic component of the first embodiment will be described. The manufacturing procedure is shown in FIG. 6. As shown in FIG. 6(A), the dielectric body portion 11 is prepared, and the intermediate layer 13 is provided in a predetermined area of the lower wall surface of the dielectric body portion 11 by printing. Next, as shown in FIG. 6(B), the second joint layer 15 is provided in a predetermined area of the lower wall surface of the dielectric body portion 11 by printing. Thereby, a partial laminated body 10A is produced. Meanwhile, as shown in FIG. 6(C), the magnetic body portion 12 is prepared, and the first joint layer 14 is provided onto the entire upper wall surface of the magnetic body portion 12 by printing. Thereby, a partial laminated body 10B is produced. As shown in FIG. 6(D), the partial laminated bodies 10A, 10B are assembled to each other in a manner that an entire lower wall surface of the partial laminated body 10A (more specifically, the entire lower wall surface of the intermediate layer 13 and the entire lower wall surface of the second joint layer 15) and an entire upper wall surface of the partial laminated body 10B (more specifically, the entire upper wall surface of the first joint layer 14) are in contact with each other. By pressing with uniaxial press or CIP (Cold Isostatic Press), a laminated body 10C is produced as shown in FIG. 6(E). Next, the laminated body 10C is cut into individual laminated bodies to each form one final composite electronic component 10. By sintering and then cooling the individual laminated bodies, and providing the external electrodes 16A to 16H, the composite electronic component 10 is manufactured.

Figure 7:
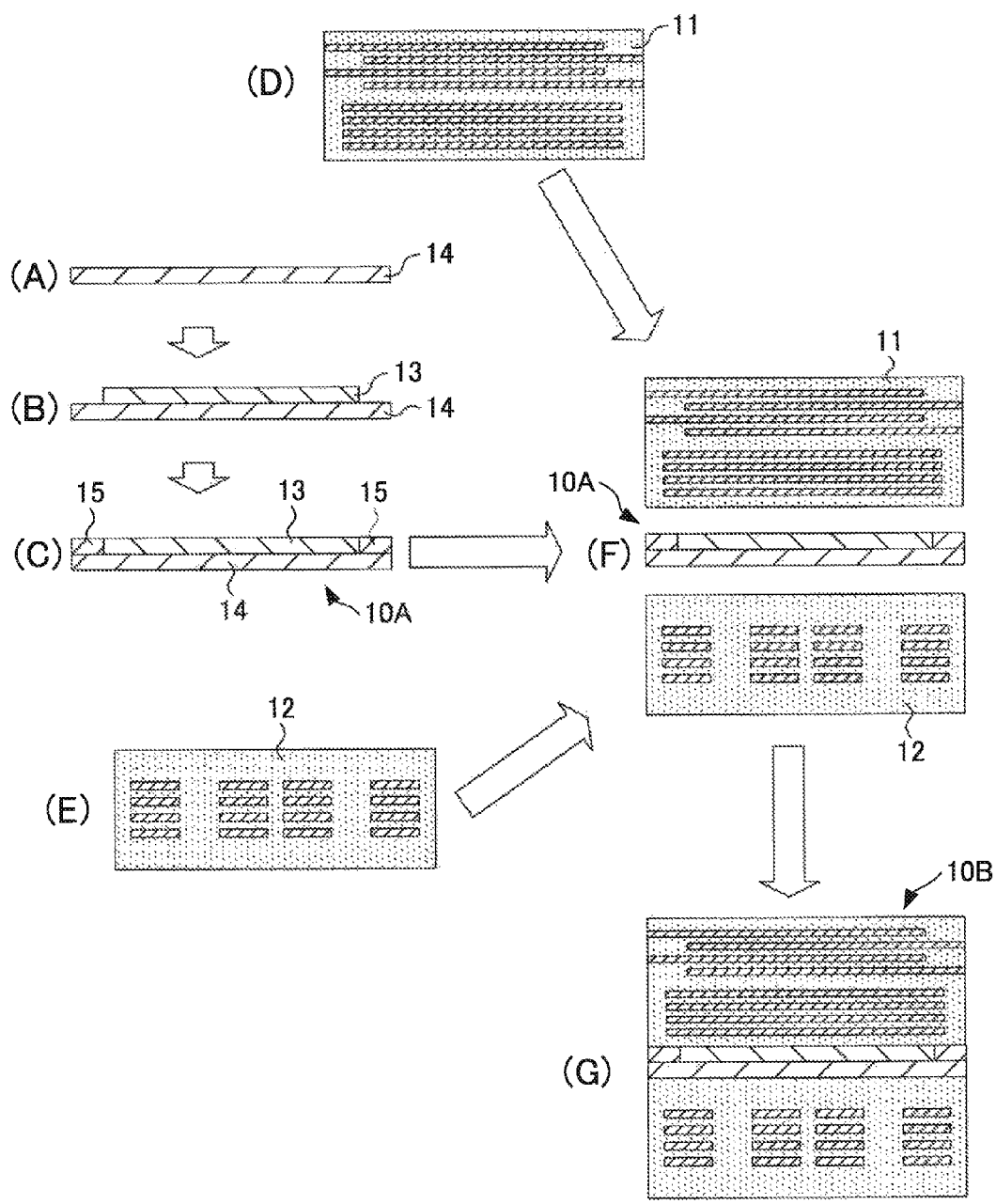
FIG. 7 is a view showing still another example of the manufacturing procedure of the composite electronic component of the first embodiment.

Next, still another example of the manufacturing procedure of the composite electronic component of the first embodiment will be described. The manufacturing procedure is shown in FIG. 7. As shown in FIG. 7(A), the first joint layer 14 is prepared. Next, as shown in FIG. 7(B), the intermediate layer 13 is provided in a predetermined area of the upper wall surface of the first joint layer 14 by printing. Next, as shown in FIG. 7(C), the second joint layer 15 is provided in a predetermined area of the upper wall surface of the first joint layer 14 by printing. Thereby, a partial laminated body 10A is produced. Meanwhile, as shown in FIG. 7(D), the dielectric body portion 11 is prepared. Meanwhile, as shown in FIG. 7(E), the magnetic body portion 12 is prepared. As shown in FIG. 7(F), the partial laminated body 10A, the dielectric body portion 11, and the magnetic body portion 12 are assembled to each other in a manner that an entire upper wall surface of the partial laminated body 10A (more specifically, the entire upper wall surface of the intermediate layer 13 and the entire upper wall surface of the second joint layer 15) and the entire lower wall surface of the dielectric body portion 11 are in contact with each other, and in a manner that an entire lower wall surface of the partial laminated body 10A (more specifically, the entire lower wall surface of the first joint layer 14) and the entire upper wall surface of the magnetic body portion 12 are in contact with each other. By pressing with uniaxial press or CIP (Cold Isostatic Press), a laminated body 10B is produced as shown in FIG. 7(G). Next, the laminated body 10B is cut into individual laminated bodies to each form one final composite electronic component 10. By sintering and then cooling the individual laminated bodies, and providing the external electrodes 16A to 16H, the composite electronic component 10 is manufactured.

Figure 8:
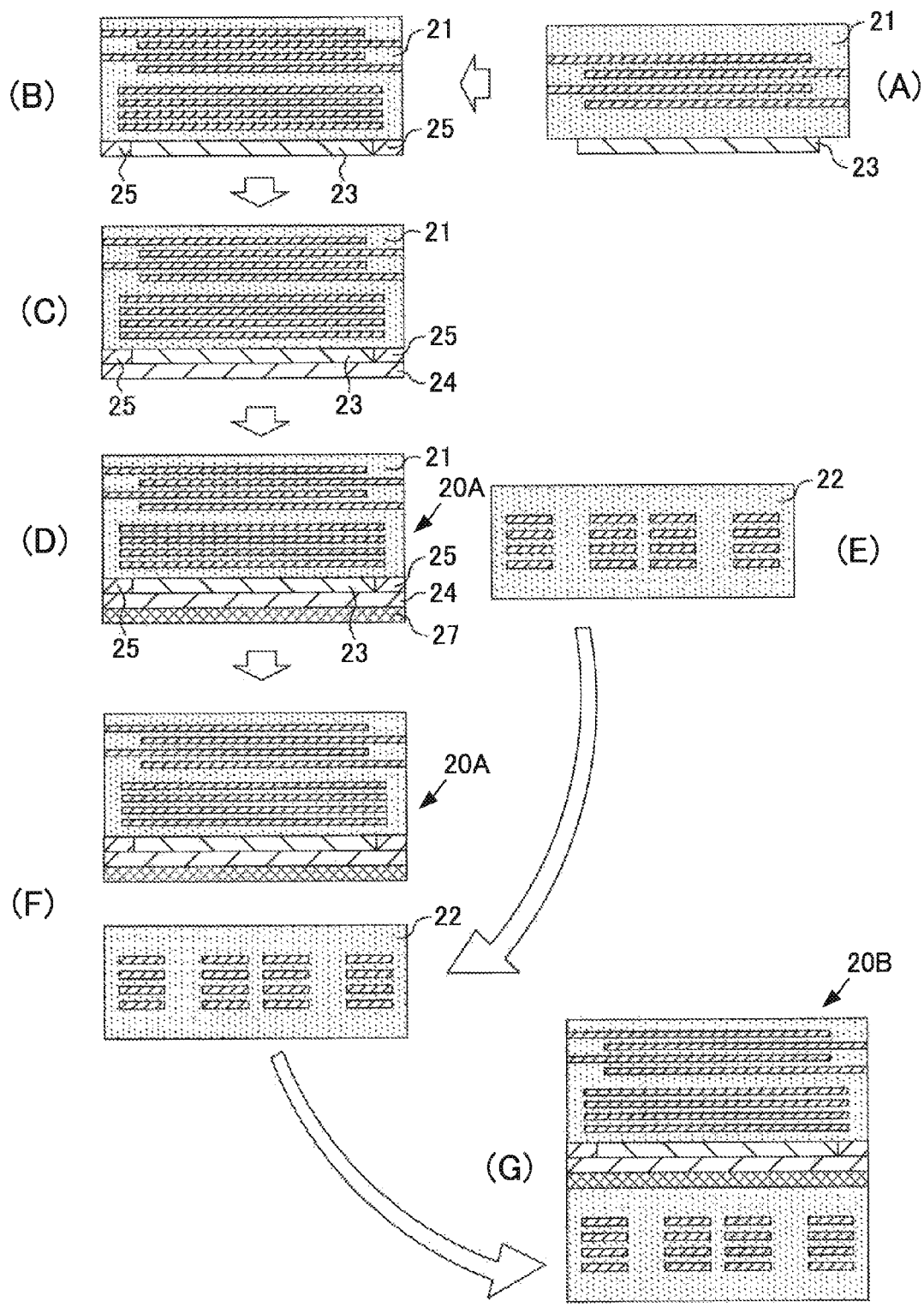
FIG. 8 is a view showing one example of a manufacturing procedure of the composite electronic component of the second embodiment.

Next, one example of a manufacturing procedure of the composite electronic component of the second embodiment will be described. The manufacturing procedure is shown in FIG. 8. As shown in FIG. 8(A), the dielectric body portion 21 is prepared, and the intermediate layer 23 is provided in a predetermined area of the lower wall surface of the dielectric body portion 21 by printing. Next, as shown in FIG. 8(B), the second joint layer 25 is provided in a predetermined area of the lower wall surface of the dielectric body portion 21 by printing. Next, as shown in FIG. 8(C), the first joint layer 24 is provided onto the entire lower wall surface of the intermediate layer 23 and the entire lower wall surface of the second joint layer 25 by printing. Next, as shown in FIG. 8(D), the third joint layer 27 is provided onto the entire lower wall surface of the first joint layer 24 by printing. Thereby, a partial laminated body 20A is produced. Meanwhile, as shown in FIG. 8(E), the magnetic body portion 22 is prepared. As shown in FIG. 8(F), the partial laminated body 20A and the magnetic body portion 22 are assembled to each other in a manner that an entire lower wall surface of the partial laminated body 20A (more specifically, the entire lower wall surface of the third joint layer 27) and the entire upper wall surface of the magnetic body portion 22 are in contact with each other. By pressing with uniaxial press or CIP (Cold Isostatic Press), a laminated body 20B is produced as shown in FIG. 8(G). Next, the laminated body 20B is cut into individual laminated bodies to each form one final composite electronic component 20. By sintering and then cooling the individual laminated bodies, and providing the external electrodes 26A to 26H, the composite electronic component 20 is manufactured.

Figure 9:
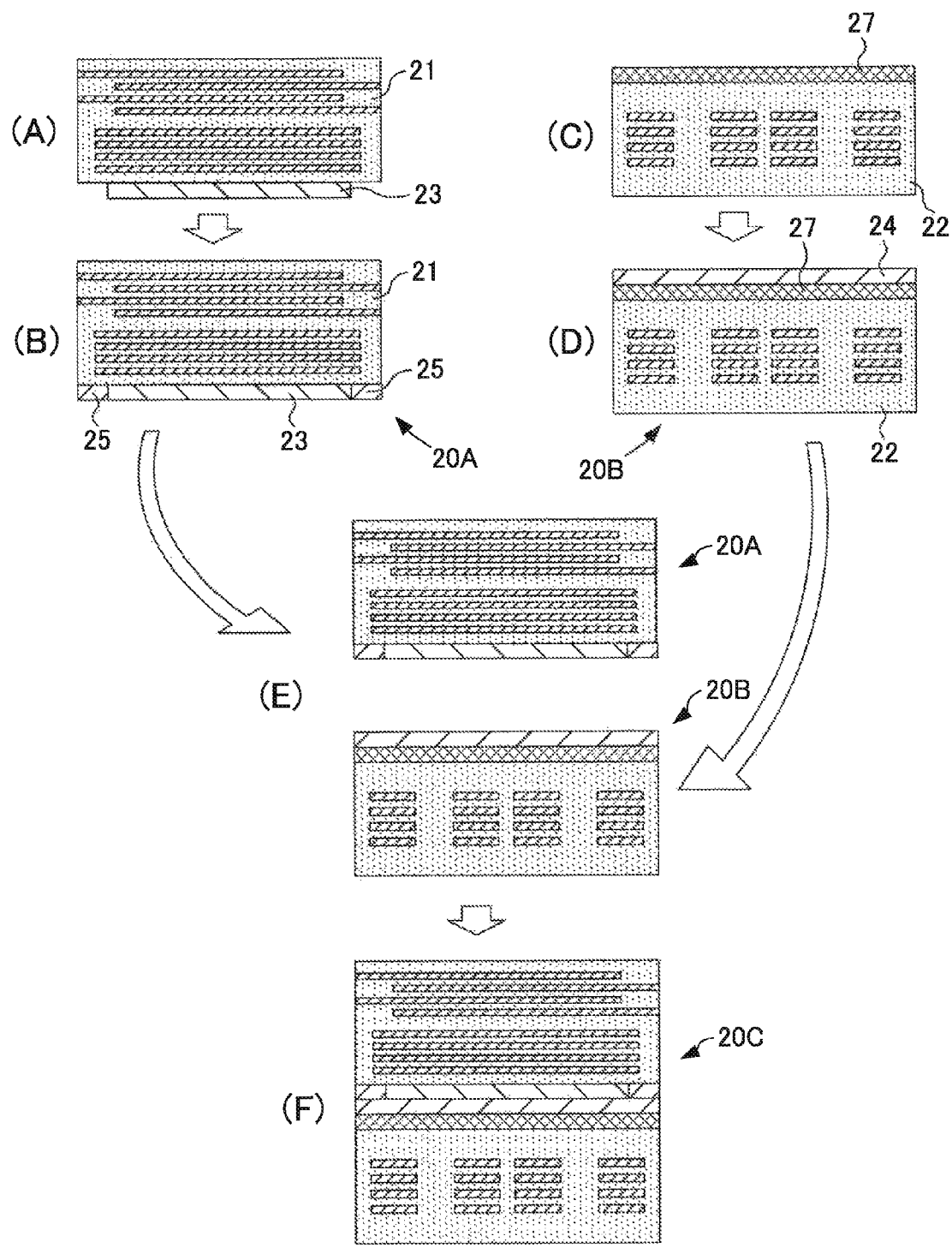
FIG. 9 is a view showing another example of the manufacturing procedure of the composite electronic component of the second embodiment.

Next, another example of the manufacturing procedure of the composite electronic component of the second embodiment will be described. The manufacturing procedure is shown in FIG. 9. As shown in FIG. 9(A), the dielectric body portion 21 is prepared, and the intermediate layer 23 is provided in a predetermined area of the lower wall surface of the dielectric body portion 21 by printing. Next, as shown in FIG. 9(B), the second joint layer 25 is provided in a predetermined area of the lower wall surface of the dielectric body portion 21 by printing. Thereby, a partial laminated body 20A is produced. Meanwhile, as shown in FIG. 9(C), the magnetic body portion 22 is prepared, and the third joint layer 27 is provided onto the entire upper wall surface of the magnetic body portion 22 by printing. Next, as shown in FIG. 9(D), the first joint layer 24 is provided onto the entire upper wall surface of the third joint layer 27 by printing. Thereby, a partial laminated body 20B is produced. As shown in FIG. 9(E), the partial laminated bodies 20A, 20B are assembled to each other in a manner that an entire lower wall surface of the partial laminated body 20A (more specifically, the entire lower wall surface of the intermediate layer 23 and the entire lower wall surface of the second joint layer 25) and an entire upper wall surface of the partial laminated body 20B (more specifically, the entire upper wall surface of the first joint layer 24) are in contact with each other. By pressing with uniaxial press or CIP (Cold Isostatic Press), a laminated body 20C is produced as shown in FIG. 9(F). Next, the laminated body 20C is cut into individual laminated bodies to each form one final composite electronic component 20. By sintering and then cooling the individual laminated bodies, and providing the external electrodes 26A to 26H, the composite electronic component 20 is manufactured.

Figure 10:
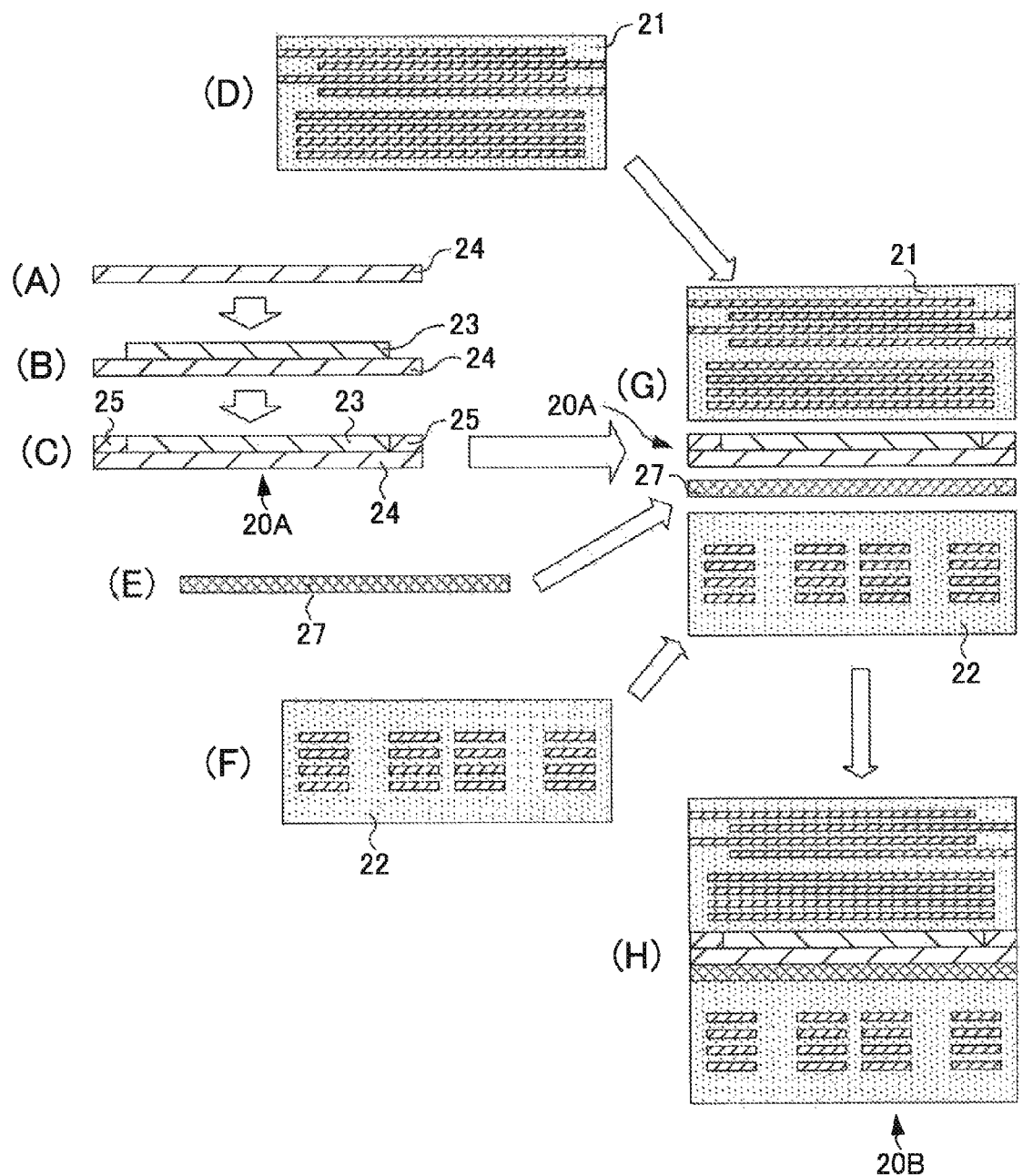
FIG. 10 is a view showing still another example of the manufacturing procedure of the composite electronic component of the second embodiment.

Next, still another example of the manufacturing procedure of the composite electronic component of the second embodiment will be described. The manufacturing procedure is shown in FIG. 10. As shown in FIG. 10(A), the first joint layer 24 is prepared. Next, as shown in FIG. 10(B), the intermediate layer 23 is provided in a predetermined area of the upper wall surface of the first joint layer 24 by printing. Next, as shown in FIG. 10(C), the second joint layer 25 is provided in a predetermined area of the upper wall surface of the first joint layer 24 by printing. Thereby, a partial laminated body 20A is produced. Meanwhile, as shown in FIG. 10(D), the dielectric body portion 21 is prepared. Meanwhile, as shown in FIG. 10(E), the third joint layer 27 is prepared. Meanwhile, as shown in FIG. 10(F), the magnetic body portion 22 is prepared. As shown in FIG. 10(G), the partial laminated body 20A, the dielectric body portion 21, the third joint layer 27, and the magnetic body portion 22 are assembled to each other in a manner that an entire upper wall surface of the partial laminated body 20A (more specifically, the entire upper wall surface of the intermediate layer 23 and the entire upper wall surface of the second joint layer 25) and the entire lower wall surface of the dielectric body portion 21 are in contact with each other, an entire lower wall surface of the partial laminated body 20A (more specifically, the entire lower wall surface of the first joint layer 24) and the entire upper wall surface of the third joint layer 27 are in contact with each other, and the entire lower wall surface of the third joint layer 27 and the entire upper wall surface of the magnetic body portion 22 are in contact with each other. By pressing with uniaxial press or CIP (Cold Isostatic Press), a laminated body 20B is produced as shown in FIG. 10(H). Next, the laminated body 20B is cut into individual laminated bodies to each form one final composite electronic component 20. By sintering and then cooling the individual laminated bodies, and providing the external electrodes 26A to 26H, the composite electronic component 20 is manufactured.

What is claimed is:

1. A composite electronic component, comprising:
    a dielectric body portion inside of which a conductive body is provided;
    a first joint layer and a second joint layer;
    an intermediate layer surrounded by the second joint layer, the intermediate layer and the second joint layer having lower surfaces that both extend along a single plane; and
    a magnetic body portion inside of which a conductive body is provided, wherein
    the intermediate layer and the surrounding second joint layer are interposed between the dielectric body portion and the first joint layer and the first joint layer is interposed between the intermediate layer and the surrounding second joint layer and the magnetic body portion,
    the first joint layer is formed of a material other than a material forming a main body of the dielectric body portion and a material forming a main body of the magnetic body portion, and
    the second joint layer is formed of a material other than the material forming the main body of the dielectric body portion and a material forming the main body of the magnetic body portion.

2. The composite electronic component according to claim 1, wherein
    the intermediate layer is made of the same material or the same element as a material or an element of the conductive body of the dielectric body portion, or the same material or the same element as a material or an element of the conductive body of the magnetic body portion.

3. The composite electronic component according to claim 1, wherein
    the conductive body of the dielectric body portion and the conductive body of the magnetic body portion are formed of the same material or the same element.

4. The composite electronic component according to claim 2, wherein
    the conductive body of the dielectric body portion and the conductive body of the magnetic body portion are formed of the same material or the same element.

5. The composite electronic component according to claim 1, wherein
    the second joint layer is formed of a material having a higher joint strength to the dielectric body portion than a predetermined strength, and the first joint layer is formed of a material having a higher joint strength to the magnetic body portion than a predetermined strength.

6. The composite electronic component according to claim 2, wherein the second joint layer is formed of a material having a higher joint strength to the dielectric body portion than a predetermined strength, and the first joint layer is formed of a material having a higher joint strength to the magnetic body portion than a predetermined strength.

7. The composite electronic component according to claim 3, wherein the second joint layer is formed of a material having a higher joint strength to the dielectric body portion than a predetermined strength, and the first joint layer is formed of a material having a higher joint strength to the magnetic body portion than a predetermined strength.

8. The composite electronic component according to claim 4, wherein the second joint layer is formed of a material having a higher joint strength to the dielectric body portion than a predetermined strength, and the first joint layer is formed of a material having a higher joint strength to the magnetic body portion than a predetermined strength.

* * * * *